(12) United States Patent
Niwano

(10) Patent No.: US 7,826,797 B2
(45) Date of Patent: Nov. 2, 2010

(54) COMMUNICATION SYSTEM, BASE STATION, AND MOBILE STATION

(75) Inventor: Kazuhito Niwano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 821 days.

(21) Appl. No.: 11/366,405

(22) Filed: Mar. 3, 2006

(65) Prior Publication Data

US 2006/0148413 A1 Jul. 6, 2006

Related U.S. Application Data

(62) Division of application No. 10/507,519, filed as application No. PCT/JP02/04588 on May 10, 2002, now Pat. No. 7,130,588.

(51) Int. Cl.
*H04B 17/00* (2006.01)
(52) U.S. Cl. .................................. 455/67.11; 370/448
(58) Field of Classification Search ....................... None
See application file for complete search history.

(56) References Cited

U.S. PATENT DOCUMENTS

| | | | |
|---|---|---|---|
| 5,511,067 A | 4/1996 | Miller | |
| 2001/0053142 A1 | 12/2001 | Abe et al. | |
| 2002/0075946 A1* | 6/2002 | Seo et al. | 375/148 |
| 2003/0087605 A1* | 5/2003 | Das et al. | 455/67.1 |
| 2006/0002339 A1 | 1/2006 | Niwano | |

FOREIGN PATENT DOCUMENTS

| | | |
|---|---|---|
| JP | 8-051665 | 2/1996 |
| JP | 08-051665 | 2/1996 |
| JP | 8-191477 | 7/1996 |
| JP | 08-191477 | 7/1996 |
| JP | 9-506231 | 6/1997 |
| JP | 11-041654 | 2/1999 |

OTHER PUBLICATIONS

Mitsubishi Electric "CQI Feedback Parameter k Value" Seattle, USA—Aug. 19-22, 2002.
Lucent Technologies "Need for Variable Rate Channel Quality Indication in HSDPA" Orlando, FL, USA—Feb. 18-21, 2002.
3GPP TR 25.858 V5.0.0 (Mar. 2002) $3^{rd}$ Generation Partnership Project; Technical Specification Group Radio Access Network; High Speed Downlink Packet Access: Physical Layer Aspects (Release 5) pp. 1-31.
Lucent Technologies "Variable Rate Channel Quality Indication in HSDPA" JeJu, Korea—Nov. 19-23, 2001 (pp. 1-16).
Lucent Technologies "Comparison of Channel Quality Reporting Schemes" Korpilampi, Finland—Jan. 8-11, 2002 (pp. 1-5).

(Continued)

*Primary Examiner*—Lester Kincaid
*Assistant Examiner*—Phuoc Doan
(74) *Attorney, Agent, or Firm*—Oblon, Spivak, McClelland, Maier & Neustadt, L.L.P.

(57) ABSTRACT

A communication system includes mobile stations carrying out transmission at report cycles selected from a group consisting of 0, 1 and other integers without having a relation of a multiple and including a lot of prime numbers.

8 Claims, 8 Drawing Sheets

OTHER PUBLICATIONS

Samsung Electronics "Adaptive Signalling of CQI Report" Orlando, USA—Feb. 18-22, 2002.

3GPP TR 25.858 V5.0.0 (Mar. 2002); 3$^{rd}$ Generation Partnership Project; Technical Specification Group Radio Access Network; High Speed Downlink Packet Access: Physical Layer Aspects (Release 5); pp. 1-31.

Kimiharu Kanemaru et al.; "Power Line Maintenance Information System Using Low-Power Radio Data Transmission"; T. IEE Japan, vol. 114-B, No. 5, '94; pp. 514-522 (with partial translation).

U.S. Appl. No. 11/366,406, filed Mar. 3, 2006, Niwano.

U.S. Appl. No. 11/366,399, filed Mar. 3, 2006, Niwano.

Fumiyuk Adachi, et al., "Wideband DS-CDMA for next-genration mobile communication systems", IEEE Ccommunications Magazine, pp. 56-59.

Keiji Tachikawa, "W-CDMA mobile communication system", Maruzen Co. Ltd., pp. 103 and 401 Sep. 25, 2001 (with partial English translation).

3$^{rd}$ Generattion Partnership Project: Technical Specification Group Radio Access Network; High Speed Downlink Packet Access: Physical Layer Acpects (Release 5), 3GPP TR 25.858 v5.0.0 (Mar. 2002).

Kimiharu Kanemaru, et al., "Power Line Maintenance Information System Using Low-Power Radio Data Transmission", T. IEE Japan, vol. 114-B, No. 5, 1994, pp. 514-522 (with English Abstract).

\* cited by examiner

COMMUNICATION SYSTEM, BASE STATION, AND MOBILE STATION

TECHNICAL FIELD

The present invention relates to a communication system, base station, and mobile station of mobile communications for carrying out high-speed radio data communication.

BACKGROUND ART

A plurality of communication schemes called a third generation are adopted as IMT-2000 by ITU (International Telecommunication Union) as mobile radio communication schemes typified by mobile telephones. Among them, W-CDMA (Wideband Code Division Multiple Access) was put into commercial service in Japan in 2001.

The W-CDMA scheme aims to achieve a communication rate of about 2 Mbps (megabits per second) per mobile station at the maximum. The first specification was decided and published by 3GPP (Third-Generation Partnership Project; http://www.3gpp.org), one of the standardization groups, as Release 1999, a version standardized in 1999. Incidentally, as a detailed manual of the W-CDMA FDD schemes in general, "W-CDMA mobile communication system", supervised by Keiji Tachikawa, Maruzen Co., Ltd. is known.

FIG. 1 is a schematic diagram showing a conventional communication system based on the W-CDMA scheme. In FIG. 1, the reference numeral 1 designates a base station (BS), 2 designates a mobile station (MS) that carries out radio communication with the base station 1, 3 designates a downlink, 3a designates a channel (dedicated channel) assigned to the mobile station individually among the downlink 3 used by the base station 1 for transmitting data to the mobile station 2, 3b designates a channel (shared channel) transmitted to a plurality of mobile stations in common among the downlink 3, and 4 designates an uplink (dedicated channel) used by the mobile station 2 for transmitting data to the base station 1.

The W-CDMA is divided into FDD (Frequency Division Duplex) that assigns different radio frequencies to downlink 3 and uplink 4, and TDD (Time Division Duplex) that utilizes the same radio frequency and separates the downlink 3 and uplink 4 on a time division basis. Here, the FDD will be described.

Next, the operation will be described.

The downlink 3a consists of a DPDCH (Dedicated Physical Data CHannel), a data channel, and a DPCCH (Dedicated Physical Control CHannel), a control channel. Both the channels are time division multiplexed and transmitted.

The downlink 3b is a CPICH (Common Pilot CHannel) for transmitting a pilot signal for the mobile station 2 to establish synchronization with the base station 1.

The downlink 3a and downlink 3b are multiplied by spreading codes different for individual transmission data to separate the channels, followed by multiplication of a base station identification code (the so-called scramble code) assigned to the base station 1 to be transmitted.

The uplink 4 consists of a DPDCH (Dedicated Physical Data CHannel), a data channel, and a DPCCH (Dedicated Physical Control CHannel), a control channel, which are transmitted after undergoing IQ multiplexing.

The uplink 4 is multiplied by spreading codes different for individual transmission data to separate the channels, followed by the IQ multiplexing, and by multiplication by a mobile station identification code (the so-called scramble code) assigned to the mobile station 2 to be transmitted.

Recently, a large volume packet data transmission method has become popular in which a transmission rate of the downlink 3 is higher than that of the uplink 4, which is typified by the utilization of the Internet. To further increase the rate of the downlink data to be transmitted from the base station 1 to the mobile station 2 in this method, HSDPA (High Speed Downlink Packet Access), in which exclusive downlink for high-speed packet transmission is to be added, has been proposed and studied (see "High Speed Downlink Packet Access Physical Layer Aspects (Release 5)" of 3GPP specification TR25.858 v5.0.0 (2002-03)). FIG. 2 is a diagram showing a configuration of the HSDPA. In FIG. 2, the reference numeral 5 designates an exclusive downlink for the high-speed packet transmission, and 6 designates an uplink. The remaining components are the same as those of FIG. 1.

Next, the operation will be described.

The downlink 5, which is transmitted using a so-called shared channel common to a plurality of mobile stations, is divided into a HS-DSCH (High Speed-Downlink Shared CHannel), a data channel, and a HS-SCCH (High Speed-Shared Control CHannel), a control channel.

It has been decided that the HS-DSCH employs AMC (Adaptive Modulation and Coding) that can adaptively vary a modulation scheme (such as QPSK and 16 QAM) and an error-correcting coding rate in accordance with a downlink environment (quality). In addition, because of packet transmission, retransmission control (ARQ: Auto Repeat reQuest) is carried out for reception error.

Furthermore, both the channels (HS-DSCH and HS-SCCH) are subjected to channel separation and base station identification just as the other downlinks (downlinks 3a and 3b).

In addition, to add the new downlink 5, it has been studied that the mobile station 2 transmits, to the base station 1, response data (ACK/NACK) corresponding to the downlink high-speed packet data, and downlink quality information (QI: Quality Indicator). To transmit the response data, a dedicated individual control channel (uplink 6) is added as shown in FIG. 2.

As for the uplink 6, it has been studied to separate and identify the channel using a spreading code for channel separation in the same manner as the conventional uplink channel, followed by carrying out additional IQ multiplexing to the conventional uplink 4. In TR25.858, the dedicated control channel is referred to as "HS-DPCCH" (High Speed-Dedicated Physical Control CHannel).

As for the ACK/NACK, it has been studied to transmit from the mobile station 2 only when data is transmitted from the base station 1 through the downlink 5, and is not transmitted unless a packet is transmitted. As for the QI, it is studied to transmit it from the mobile station 2 to the base station 1 periodically. Accordingly, the transmissions are performed independently.

The transmission cycle and timing offset of the QI is specified by the base station 1 as parameters in advance, and their values (report cycle k, and offset) are defined in TR25.858. The values and ranges of these values, however, are provisional values for discussion, and have not yet been determined. The provisional values of the k are 0, 1, 5, 10, 20, 40, and 80, and the ranges of the offset for each k can take values of $0 \leq \text{offset} \leq k-1$. Since the k and offset are parameters, they can be altered halfway through the communication in accordance with a variable rate of the downlink environment.

FIG. 3 is a diagram illustrating a format of the HS-DPCCH, which will be described below.

It has been studied to separate the ACK/NACK data field from the QI data field in time, and to assign the QI twice the time assigned to the ACK/NACK. The combination of the two data is specified in terms of a time unit (Subframe) of 2 ms. The Subframe is also a transmission unit of the HSDPA downlink 5.

The report cycle k and offset are represented in terms of the Subframe used as the unit.

FIG. 4 is a diagram illustrating transmission timing of the QI excerpted. FIG. 4 illustrates an example including three mobile stations (MS's) to which the report cycle k=5 is assigned and one mobile station (MS) to which k=1 is assigned. The mobile stations with k=5 are assigned different offsets (=0, 1 and 2). In contrast, the mobile station with k=1 is assigned the offset=0, which means that the transmission is carried out consecutively because the report cycle is one.

Although the report cycle k is assumed to be one of 0, 1, 5, 10, 20, 40, and 80 at the present, their evidence is not cited. It is assumed that k=0 indicates no transmission.

FIG. 5 is a conceived internal block diagram of a base station enabling the HSDPA, and FIG. 6 is a conceived internal block diagram of a mobile station enabling the HSDPA. In FIG. 5, reference numerals 200a, 200b and 200c each designate a spreader, and 201a, 201b and 201c each designate a scrambler. The reference numeral 202 designates an adder, 203 designates a (transmitting) frequency converter, 204 designates a transmitting/receiving antenna, and 205 designates an ARQ controller for carrying out AMC operation and retransmission timing control. The reference numeral 206 designates a (receiving) frequency converter, and 207 designates a descrambler. Reference numerals 208a and 208b each designate a despreader, the reference numeral 209 designates a (time) divider, 210 designates a table for selecting an MCS from the QI, and 211 designates an MCS controller. The MCS will be described later.

In FIG. 6, reference numerals 300a and 300b each designate a spreader and 301a and 301b each designate a scrambler. The reference numeral 302 designates an adder, 303 designates a (transmitting) frequency converter, 304 designates a transmitting/receiving antenna, and 305 designates a (time) combiner. The reference numeral 306 designates a (receiving) frequency converter, and 307 designates a descrambler. Reference numerals 308a, 308b and 308c each designate a despreader. The reference numeral 309 designates a QI transmission controller, 310 designates a converter, 311 designates a QI transmission timing controller, 312 designates a data decision circuit, and 313 designates an ACK/NACK transmission timing controller.

In FIGS. 5 and 6, the parameters (k and offset) for determining the QI transmission timing are assumed to be transmitted as part of the DPDCH, the conventional data channel, and informed to the mobile station. In addition, as a downlink quality evaluation method, a method is assumed of using the SN ratio of the CPICH estimated by the mobile station. This is because the CPICH is always transmitted at a constant transmit power, which enables the evaluation of the downlink quality.

Next, the transmitting operation from the base station and the receiving operation in the base station will be described.

The data of the CPICH, a shared channel, and the data of the DPDCH/DPCCH, individual channels, are spread by the individual spreaders 200a and 200b using the different channel spreading codes according to the well-known common technique, followed by being multiplied by the mobile station identification code (scramble code) at the scramblers 201a and 201b according to the well-known common technique, and are input to the adder 202.

On the other hand, the data of the HS-DSCH/HS-SCCH, the channels for the HSDPA, are supplied to the ARQ controller 205 to undergo the transmission timing control. This is because the HSDPA channel is a shared channel for transmitting the downlink to a plurality of mobile stations, and transmits packet data. The output of the ARQ controller 205 is spread by the spreader 200c according to the well-known common technique, is multiplied by the mobile station identification code at the scrambler 201c according to the well-known common technique, and is supplied to the adder 202.

The data summed up by the adder 202, the so-called baseband frequency signal, is converted to a radio frequency signal by the (transmitting) frequency converter 203 according to the well-known common technique, and is transmitted from the transmitting/receiving antenna 204 to the mobile station as the downlink.

On the other hand, the radio frequency signal received from the mobile station by the transmitting/receiving antenna 204 is converted to a baseband signal by the (receiving) frequency converter 206 according to the well-known common technique. The baseband signal is multiplied by the scramble code, the identification number of the mobile station received, at the descrambler 207 according to the well-known common technique.

The HS-DPCCH is despread by the despreader 208a according to the well-known common technique, and is extracted as the original transmission data to be divided to the ACK/NACK data and QI information data by the (time) divider 209. The ACK/NACK data, the packet response, is supplied to the ARQ controller 205 to undergo the retransmission and timing control in accordance with the response.

The QI data separated by the (time) divider 209 is converted to the MCS (Modulation. & Coding Scheme) information for packet transmission corresponding to the downlink quality (QI) by the table 210. The MCS information output from the table 210 is supplied to the MCS controller 211. The MCS controller 211 supplies the ARQ controller 205 with a signal for controlling the AMC operation, thereby carrying out the AMC operation.

The DPDCH/DPCCH, the conventional uplink channels, are despread by the despreader 208b, and are restored to the original transmission data.

Next, the operation of the mobile station will be described with reference to FIG. 6.

First, the transmitting operation of the mobile station will be described, and then the receiving operation of the mobile station will be described.

The data of the DPDCH/DPCCH, the conventional channels transmitted from the mobile station, is spread by the spreader 300a using the channel separating spreading code according to the well-known common technique, is multiplied by the mobile station identification code at the scrambler 301a according to the well-known common technique, and is supplied to the adder 302.

As for the data (ACK/NACK and QI) of the HS-DPCCH, the HSDPA channel, if any transmission data is present, it is time division multiplexed by the (time) combiner 305 in accordance with the format. Then, the data is spread by the spreader 300b using the channel spreading code according to the well-known common technique, is multiplied by the mobile station identification code at the scrambler 301b according to the well-known common technique, and is supplied to the adder 302.

The adder 302 sums up the outputs of the scramblers 301a and 301b. The output of the adder 302, the so-called baseband frequency signal, is converted to the radio frequency signal by the (transmitting) frequency converter 303 according to the well-known common technique, and is transmitted from the transmitting/receiving antenna 304 to the base station via the uplink.

On the other hand, the radio frequency signal from the base station received by the transmitting/receiving antenna 304 is converted to a baseband signal by the (receiving) frequency converter 306 according to the well-known common technique. The baseband signal is multiplied by the scramble code, the identification number of the base station received, at the descrambler 307 according to the well-known common technique.

As for the DPDCH/DPCCH, which are the conventional channels, they are despread by the despreader 308a according to the well-known common technique, and are extracted as the original data. At the same time, they are supplied to the QI transmission controller 309 that extracts and holds the QI transmission parameters.

The CPICH, the shared channel, is despread by the despreader 308b according to the well-known common technique. The converter 310 calculates the SN ratio of the CPICH from the output of the despreader 308b to generate the QI information data to be transmitted. The QI information data is transmitted as the HS-DPCCH under the timing control of the QI transmission timing controller 311 according to the parameters of the QI transmission controller 309.

As an example of the correspondence between the SN ratio of the CPICH and the QI information data, the relation as shown in Table 1 is specified in a standard in advance. This make is possible for the base station and mobile station to transmit and receive AMC controlled data using only the QI data.

TABLE 1

| SN ratio (dB) | QI transmission data | modulation scheme, encoding ratio | transmission rate (bps) |
| --- | --- | --- | --- |
| −10 | 1 | QPSK, 1/3 | 3M |
| −5 | 2 | QPSK, 1/2 | 5M |
| 0 | 3 | 16QAM, 1/3 | 7M |
| 5 | 4 | 16QAM, 1/2 | 10M |

The HS-SDCH/HS-SCCH, the channels for the HSDPA, are despread by the despreader 308c to extract the data according to the well-known common technique. The data decision circuit 312 decides the presence or absence of an error of the extracted packet data, and generates the ACK when the error is absent, and the NACK if the error is present. The ACK/NACK data undergoes the timing control by the ACK/NACK transmission timing controller 313, and is transmitted as the HS-DPCCH.

FIG. 7 is a diagram illustrating an example of the QI transmission timing of the conventional communication system.

FIG. 7 illustrates individual QI transmission states of the system including three mobile stations with k=5 and different offsets (offsets=0, 1, 2), and one mobile station with k=10 and offset=0.

The values k and offsets can vary from mobile station to mobile station because the base station notifies the mobile stations of different values depending on the changing environment and quality of the downlinks to the mobile stations.

When the mobile stations with different k are present in the system, and if the values k have a relation of a multiple such as 5 and 10, the probability of coincidence of the transmission timing increases for a combination of particular mobile stations depending on the manner of assigning the offset (in FIG. 7, the two mobile stations (MS#1 and MS#4) with the offset=0 have the coincidence).

In addition, if these mobile stations are close to each other, the interference between the mobile stations can be increased.

With the foregoing configuration, the conventional communication system has a problem of causing interference because the QI transmission cycle parameters (other than 0 or 1) can take values having the relation of a multiple.

The present invention is implemented to solve the foregoing problem. Therefore it is an object of the present invention to provide a communication system capable of reducing the probability of transmission collision in a combination of particular mobile stations, and reducing the interference between the mobile stations in the communication system, in which the mobile stations report the downlink quality information at alterable report cycles.

DISCLOSURE OF THE INVENTION

According to an aspect of the present invention, there is provided a communication system in which mobile stations transmit to a base station quality information about a downlink from the base station to the mobile stations at alterable report cycles, the communication system including a channel that varies a transmission rate by changing a transmission format of data transmitted from the base station through the downlink in response to the quality information transmitted, wherein the individual report cycles of the mobile stations are selected from a group consisting of 0, 1 and at least two positive integers without having a relation of a multiple, and of at least zero positive integer greater than the at least two positive integers without having the relation of a multiple.

Thus it offers an advantage of being able to reduce the transmission collision probability in a combination of particular mobile stations, and to reduce the interference between the mobile stations.

In the communication system, the at least two positive integers without having the relation of a multiple can be prime numbers.

Thus it offers an advantage of being able to reduce the transmission collision probability in a combination of particular mobile stations, and to reduce the interference between the mobile stations.

According to another object of the present invention, there is provided a communication system in which mobile stations transmit to a base station quality information about a downlink from the base station to the mobile stations at alterable report cycles, the communication system including a channel that varies a transmission rate by changing a transmission format of data transmitted from the base station through the downlink in response to the quality information transmitted, wherein the individual report cycles of the mobile stations are selected from a group consisting of 0, 1 and positive integers equal to or greater than two, where the maximum value of the positive integers differs from a least common multiple of any two integers of the positive integers other than the maximum value.

Thus it offers an advantage of being able to reduce the collision probability up to the maximum k value.

In the communication system, the maximum value can be less than the least common multiple.

Thus the collision report cycle of the two mobile stations becomes greater than the maximum value of k, thereby offering an advantage of being able to reduce the probability of the collision between the QI transmission.

According to still another aspect of the present invention, there is provided a communication system in which mobile stations transmit to a base station quality information about a downlink from the base station to the mobile stations at alterable report cycles, the communication system including a channel that varies a transmission rate by changing a transmission format of data transmitted from the base station through the downlink in response to the quality information transmitted, wherein the individual report cycles of the mobile stations are selected from a group consisting of 0, 1 and positive integers equal to or greater than two, where larger values of the positive integers are obtained from smaller values of the positive integers.

Thus it offers an advantage of being able to reduce the probability of the collision between the QI transmission of particular mobile stations, and to eliminate the need for storing all the possible numbers of k in the base station when there are many k values.

According to still another aspect of the present invention, there is provided a communication system in which mobile stations transmit to base stations quality information about downlinks from the base stations to the mobile stations at alterable report cycles, the communication system including channels each varying a transmission rate by changing a transmission format of data transmitted from the base stations through the downlinks in response to the quality information transmitted, wherein the base stations each receive the quality information from the mobile stations at the report cycles whose possible values differ from each other.

Thus it offers an advantage of being able to reduce the probability of the collision between the QI transmission, and to reduce the interference between the mobile stations at the same time.

In the communication system, the base stations can each exchange the report cycles, at which the base stations receive the quality information from the mobile stations, via an inter-base station communication line interconnecting the base stations.

Thus using the different groups of k offers an advantage of being able to reduce the probability of the collision between the QI transmission, and to reduce the interference between the mobile stations at the same time.

According to still another aspect of the present invention, there is provided a base station characterized by selecting report cycles, at which mobile stations transmit to the base station quality information about a downlink from the base station to the mobile stations, from candidates having a plurality of report cycles including at least two report cycles without having a relation of a multiple, and by notifying the mobile stations of the report cycles selected.

Thus it offers an advantage of being able to reduce the transmission collision probability in a combination of particular mobile stations, and to reduce the interference between the mobile stations.

According to still another aspect of the present invention, there is provided a mobile station characterized by transmitting to a base station quality information about a downlink from the base station to the mobile station with switching at least two report cycles without having a relation of a multiple.

Thus it offers an advantage of being able to reduce the transmission collision probability in a combination of particular mobile stations, and to reduce the interference between the mobile stations.

In the mobile station, the at least two report cycles without having the relation of a multiple can be each n times a unit report cycle, where n is a positive integer equal to or greater than two.

Thus it offers an advantage of being able to reduce the transmission collision probability in a combination of particular mobile stations, and to reduce the interference between the mobile stations.

In the mobile station, the base station can change, in response to the quality information, a modulation scheme of a data channel used in conjunction with a DPDCH in a downlink.

Thus it offers an advantage of being able to reduce the transmission collision probability in a combination of particular mobile stations, and to reduce the interference between the mobile stations.

In the mobile station, the base station can change, in response to the quality information, an error correcting encoding ratio of a data channel used in conjunction with a DPDCH in a downlink.

Thus it offers an advantage of being able to reduce the transmission collision probability in a combination of particular mobile stations, and to reduce the interference between the mobile stations.

BEST MODE FOR CARRYING OUT THE INVENTION

The best mode for carrying out the invention will now be described with reference to the accompanying drawings to explain the present invention in more detail.

Embodiment 1

Figure 7:
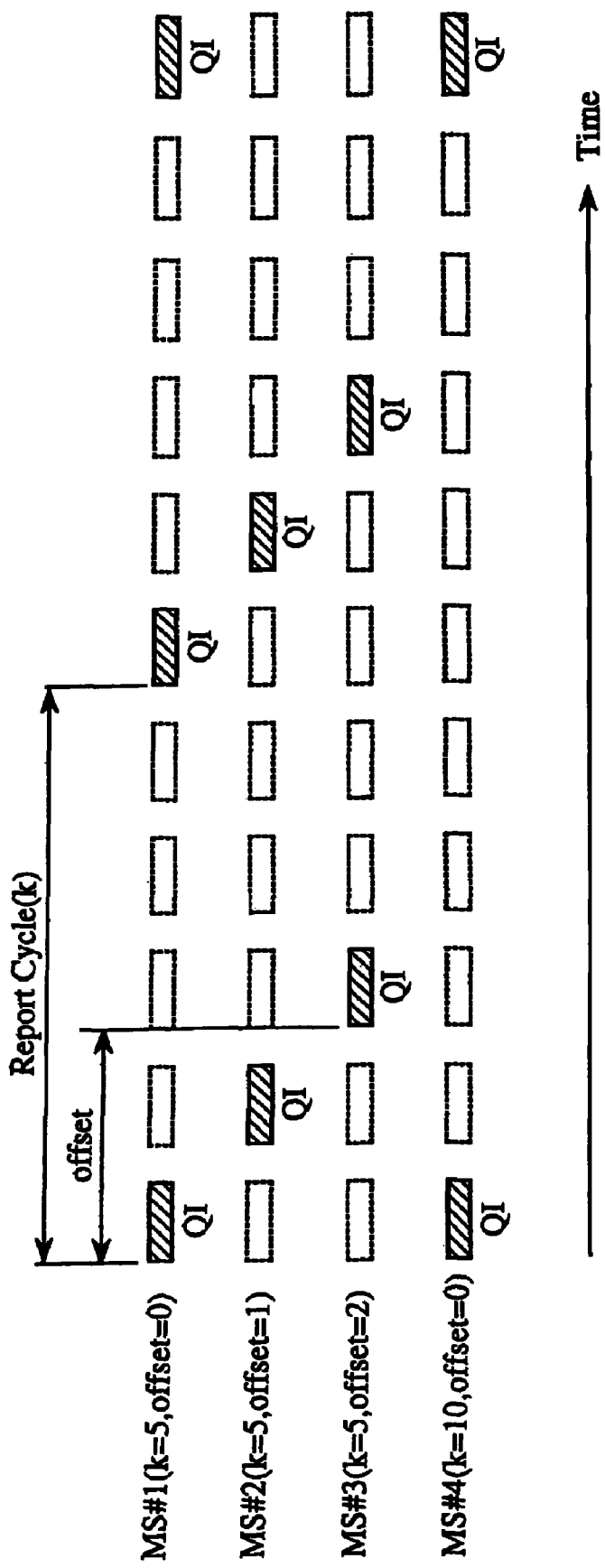
FIG. 7 is a diagram showing QI transmission timing of a conventional communication system.
Figure 8:
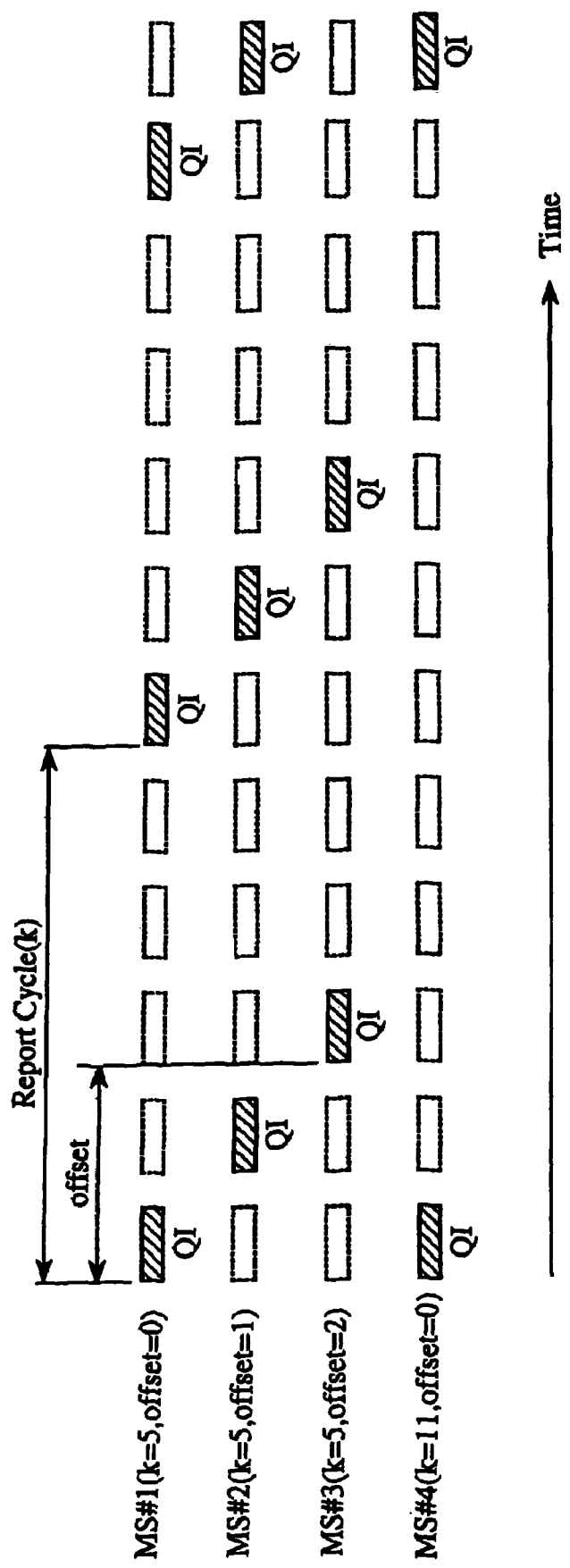
FIG. 8 is a diagram showing an example of the QI transmission timing of a communication system of an embodiment 1 in accordance with the present invention.

FIG. 8 is a diagram showing an example of the QI transmission timing of a communication system of an embodiment 1 in accordance with the present invention. It is assumed here that k is specified to take values $k \in \{0, 1, 5, 11, 19, 41, 83, 161\}$. FIG. 8 shows a case where three mobile stations with k=5 and different offsets (0, 1, 2) and one mobile station with k=11 and offset=0 each carry out the QI transmission. In contrast with this, in FIG. 7, which shows an example of the QI transmission timing of a conventional communication system, three mobile stations with k=5 and different offsets (0, 1, 2) and one mobile station with k=10 and offset=0 each carry out the QI transmission.

Figure 1:
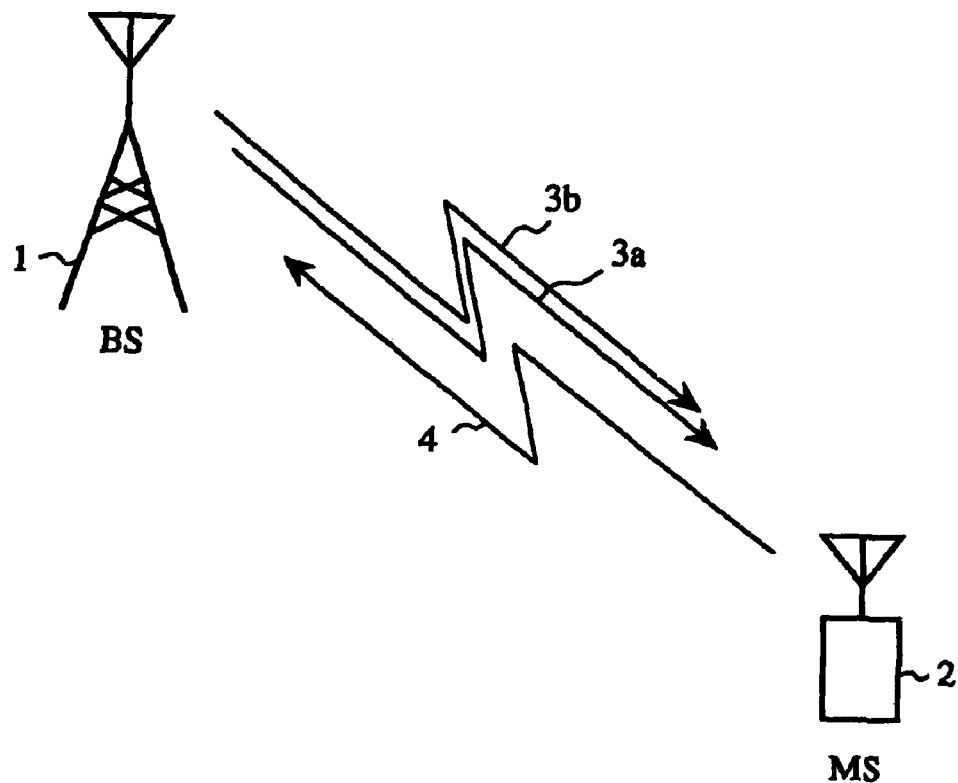
FIG. 1 is a diagram showing a configuration of a conventional communication system.
Figure 2:
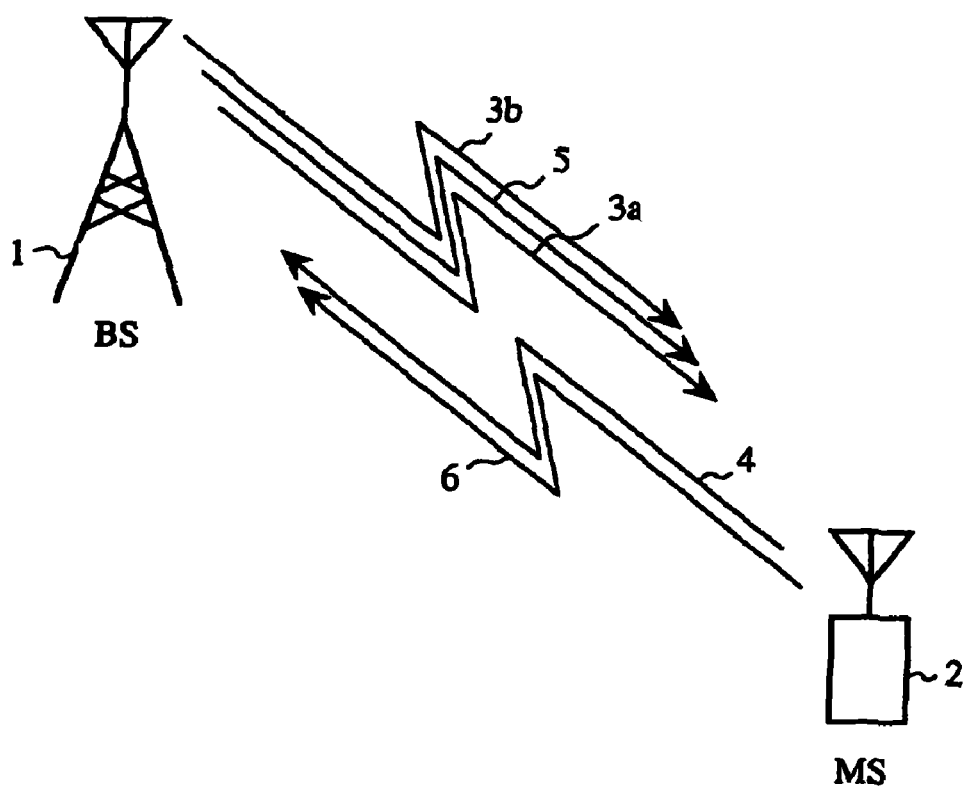
FIG. 2 is a diagram showing a configuration of HSDPA.
Figure 3:
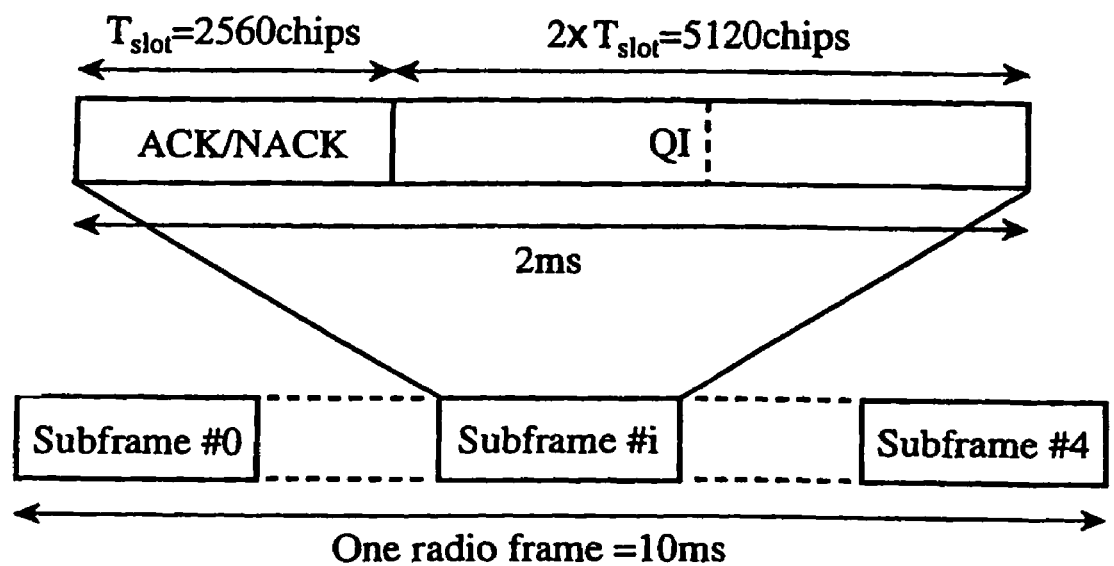
FIG. 3 is a diagram showing a format of a HS-DPCCH.
Figure 4:
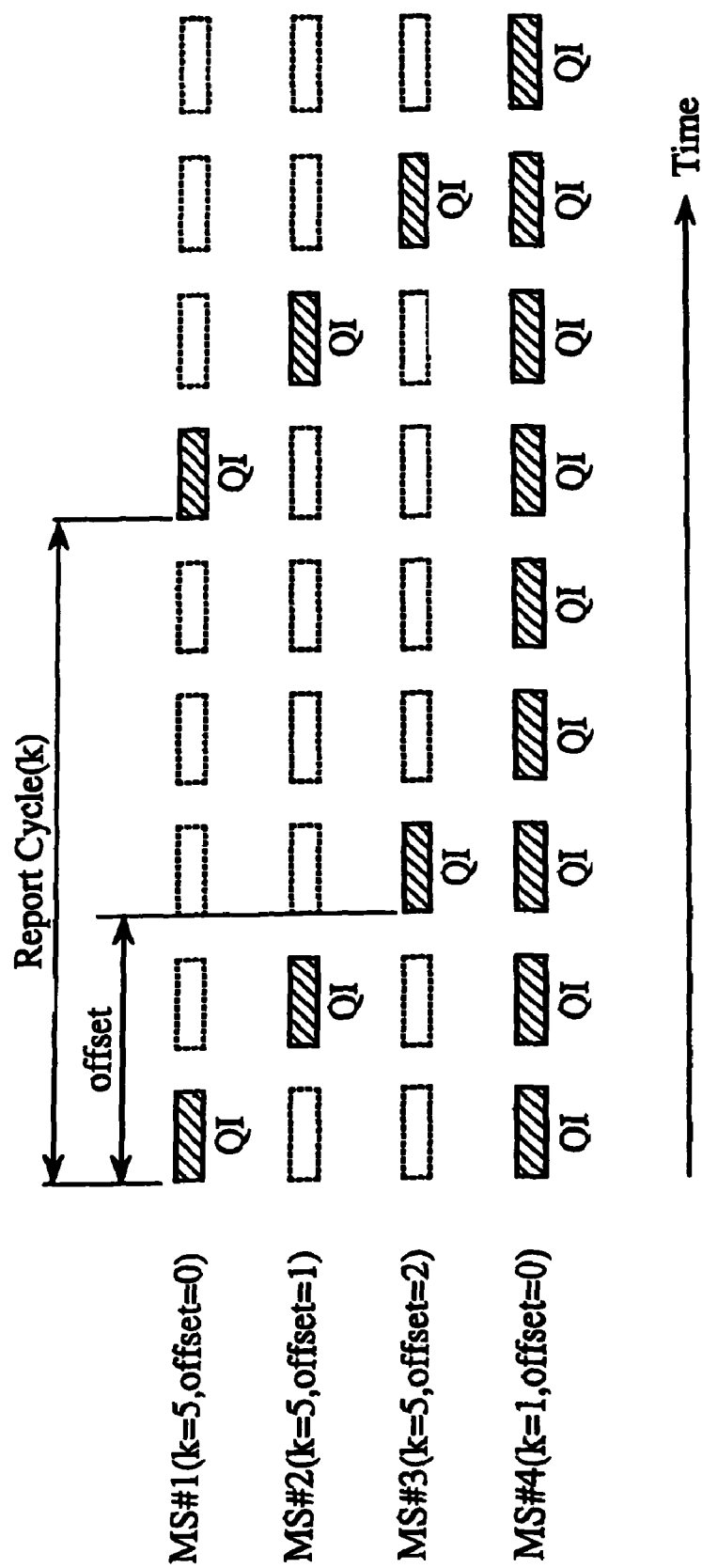
FIG. 4 is a diagram showing QI transmission timing excerpted in part.
Figure 5:
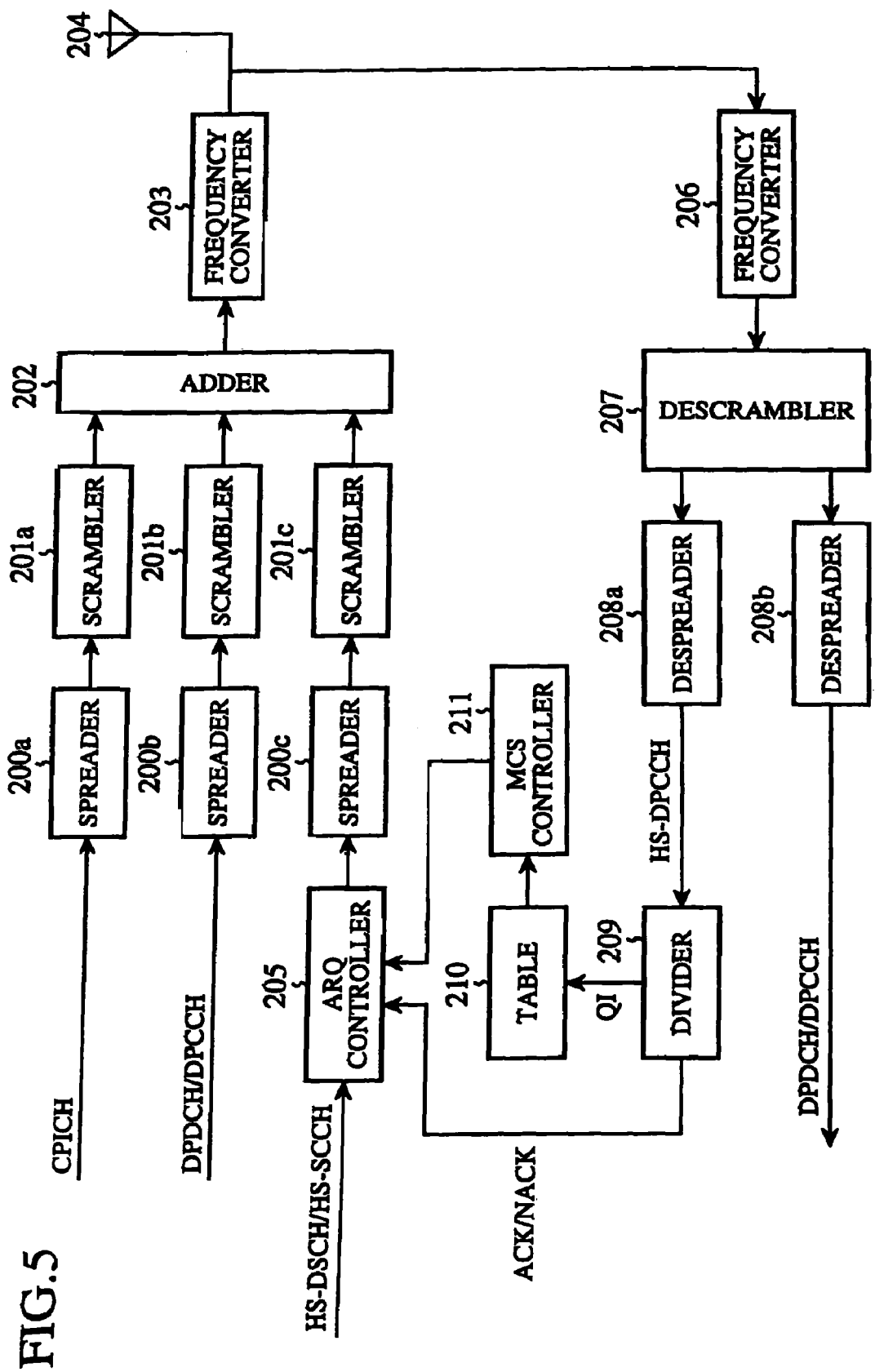
FIG. 5 is a conceived internal block diagram of a base station capable of carrying out the HSDPA.
Figure 6:
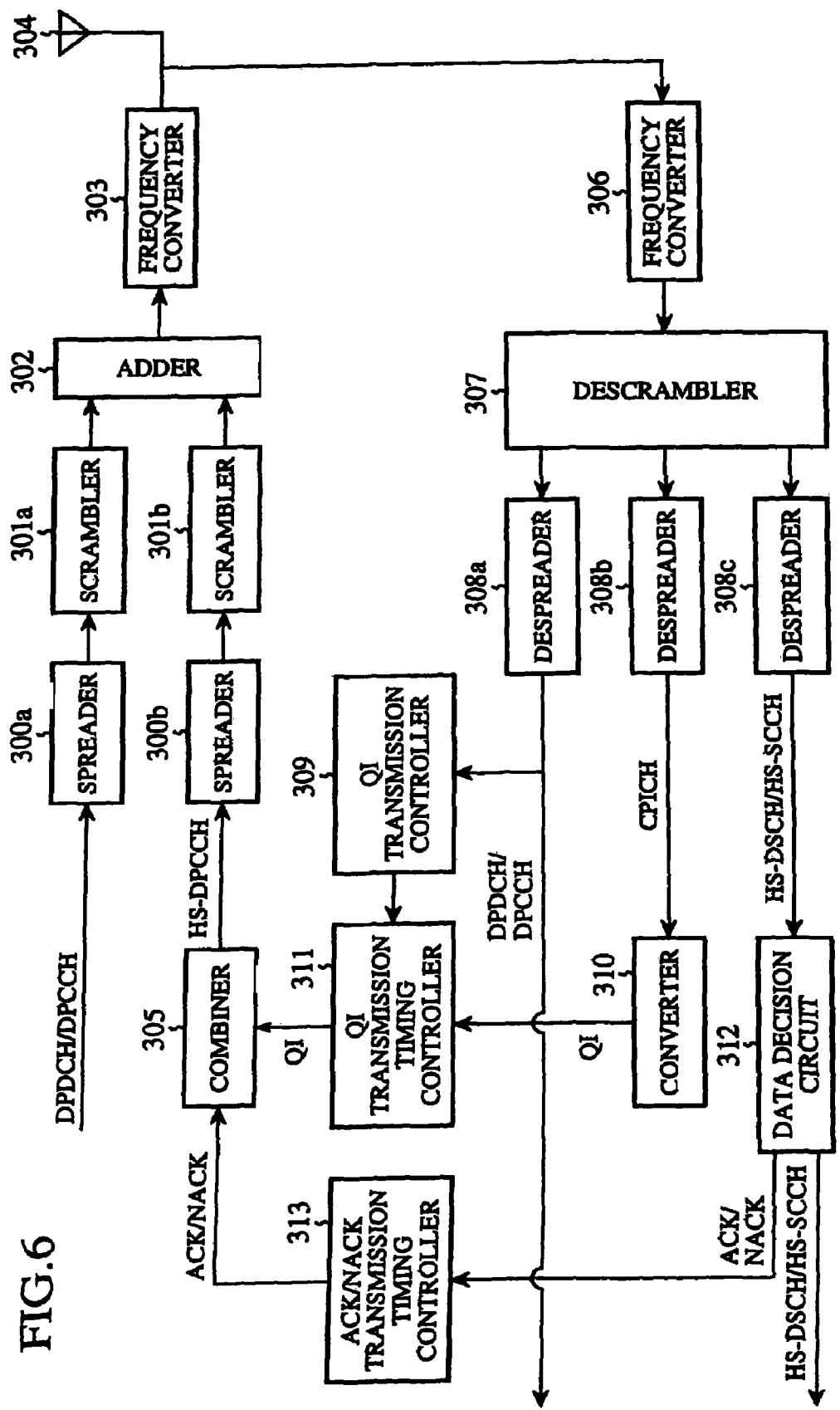
FIG. 6 is a conceived internal block diagram of a mobile station capable of carrying out the HSDPA.

The communication system of the embodiment 1 can have the same configuration of the HSDPA as shown in FIG. 2.

Next, the operation will be described.

In the present embodiment 1, the mobile stations with different k select their k not from the numbers having the relation of a multiple, but from the allowed numbers of k consisting of prime numbers such as 5 and 11. Accordingly, the report cycle that causes the transmission collision (the least common multiple of the two k's 5 and 11) becomes 55, which is longer than 10, the report cycle of the conventional communication system, that is, the least common multiple of 5 and 10. Thus, the collision probability reduces, and the combinations of the mobile stations causing the collision vary with time. As a result, the probability of coincidence of transmission timing at a particular combination of the mobile stations also reduces.

Incidentally, although the present embodiment 1 employs the numbers selected from prime numbers as the possible numbers of k other than 0 and 1, this is not essential. For example, even numbers are also available unless they have the relation of a multiple such as k={0 1, 4, 10, 22, ... }. This offers an advantage of being able to broaden the options of the base station of selecting the values k.

In addition, although the present embodiment 1 employs the numbers selected from prime numbers as the possible numbers of k other than 0 and 1, when the values k are large, the collision probability is small from the beginning. Thus the problem arises when k takes small values. Accordingly, it is not necessary to select all the k values from prime numbers. It is obvious that the substantially same advantage can be achieved by selecting small k values from prime numbers, and by assigning the same values as the conventional values to large k values.

As described above, the communication system of the present embodiment 1 is configured such that the mobile stations (2) transmit to the base station (1) the quality information (QI) about the downlink (3) from the base station (1) to the mobile stations (2) at alterable report cycles (k), and the communication system includes the channel (5) that varies the transmission rate by changing the transmission format of the data transmitted from the base station (1) through the downlink (3) according to the quality information (QI) transmitted, wherein the individual report cycles (k) of the mobile stations (2) are selected from a group consisting of 0, 1 and at least two positive integers without having the relation of a multiple, and of at least zero positive integers greater than the at least two positive integers without having the relation of a multiple.

In the communication system of the present embodiment 1, the at least two positive integers without having the relation of a multiple are prime numbers.

Although the embodiment 1 is described by way of example of the communication system, the embodiment 1 can be implemented in the form of one of the base station and mobile station constituting the communication system.

The base station of the present embodiment 1 selects the report cycles (k), at which the mobile stations (2) transmit to the base station (1) the quality information (QI) about the downlink (3) from the base station (1) to the mobile stations (2), from the candidates having a plurality of report cycles including at least two report cycles without having the relation of a multiple, and instructs the mobile stations (2) on the report cycles selected.

The mobile station of the present embodiment 1 can transmit to the base station (1) the quality information (QI) about the downlink (3) from the base station (1) to the mobile stations (2) with switching at least two report cycles (k) without having the relation of a multiple.

In the mobile station of the present embodiment 1, the at least two report cycles without having the relation of a multiple are each n times a unit report cycle (k=1), where n is a positive integer equal to or greater than two.

As for the mobile station of the present embodiment 1, according to the quality information (QI), the base station (1) changes the modulation scheme of the data channel which is used in conjunction with the DPDCH in the downlink (3).

As for the mobile station of the present embodiment 1, according to the quality information (QI), the base station (1) changes the error correcting encoding ratio of the data channel which is used in conjunction with the DPDCH in the downlink (3).

As is clear from the description above, according to the present embodiment 1, the report cycles k of the mobile stations in the combination of particular mobile stations are determined at values without having the relation of a multiple. As a result, the present embodiment 1 offers an advantage of being able to reduce the transmission collision probability in the combination of the particular mobile stations, and to reduce the interference between the mobile stations.

According to the present embodiment 1, the report cycles k of the mobile stations in the combination of particular mobile stations are prime numbers without having the relation of a multiple. As a result, the present embodiment 1 offers an advantage of being able to reduce the transmission collision probability in the combination of the particular mobile stations, and to reduce the interference between the mobile stations.

According to the present embodiment 1, the base station selects the report cycles, at which the mobile stations transmit to the base station the quality information about the downlink from the base station to the mobile stations, from the candidates having a plurality of report cycles including at least two report cycles without having the relation of a multiple, and notifies the mobile stations of the report cycles selected. As a result, the present embodiment 1 offers an advantage of being able to reduce the transmission collision probability in the combination of the particular mobile stations, and to reduce the interference between the mobile stations.

According to the present embodiment 1, the mobile station can transmit to the base station the quality information about the downlink from the base station to the mobile station with switching at least two report cycles without having the relation of a multiple. As a result, the present embodiment 1 offers an advantage of being able to reduce the transmission collision probability in the combination of the particular mobile stations, and to reduce the interference between the mobile stations.

According to the present embodiment 1, the at least two report cycles without having the relation of a multiple are each n times a unit report cycle, where n is a positive integer equal to or greater than two. As a result, the present embodiment 1 offers an advantage of being able to reduce the transmission collision probability in the combination of the particular mobile stations, and to reduce the interference between the mobile stations.

According to the present embodiment 1, the base station changes the modulation scheme of the data channel, which is used in conjunction with the DPDCH in the downlink, in accordance with the quality information. As a result, the present embodiment 1 offers an advantage of being able to reduce the transmission collision probability in the combination of the particular mobile stations, and to reduce the interference between the mobile stations.

According to the present embodiment 1, the base station changes the error correcting encoding ratio of the data channel, which is used in conjunction with the DPDCH in the downlink, in accordance with the quality information. As a result, the present embodiment 1 offers an advantage of being able to reduce the transmission collision probability in the combination of the particular mobile stations, and to reduce the interference between the mobile stations.

Embodiment 2

In the present embodiment 2, the maximum value of k is determined such that it differs from the least common multiple of any two k values less than the maximum value such as 53 of the k={0, 1, 5, 11, . . . , 53}. Thus, the collision probability reduces up to the maximum k value.

Furthermore, the maximum value of k is made less than the least common multiple of the two k values less than the maximum value except for 0 and 1, such as 53 of the k={0, 1, 5, 11, 53} is less than 55, the least common multiple of 5 and 11. Thus, as for two mobile stations assigned two k's (other than 0 and 1), the collision report cycle becomes greater than the maximum value of the k, thereby being able to reduce the probability of the collision between the QI transmission.

In the present embodiment 2, the value k is determined considering the conditions of the foregoing embodiment 1. Thus, it can positively reduce the probability of the collision between the QI transmission.

As described above, the communication system of the present embodiment 2 is configured such that the mobile stations (2) transmit to the base station (1) the quality information (QI) about the downlink (3) from the base station (1) to the mobile stations (2) at alterable report cycles (k), and the communication system includes the channel (5) that varies the transmission rate by changing the transmission format of the data transmitted from the base station (1) through the downlink (3) according to the quality information (QI) transmitted, wherein the individual report cycles (k) of the mobile stations (2) are selected from a group consisting of 0, 1 and positive integers equal to or greater than two, where the maximum value of the positive integers differs from the least common multiple of any two integers of the positive integers other than the maximum value.

In the communication system of the present embodiment 2, the maximum value is less than the least common multiple.

As is clear from the description above, according to the present, embodiment 2, the report cycles k of the mobile stations in the combination of particular mobile stations are selected from 0, 1 and positive integers equal to or greater than two, and the maximum value of the positive integers is made different from the least common multiple of any two integers of the positive integers other than the maximum value. As a result, the present embodiment 2 offers an advantage of being able to reduce the transmission collision probability up to the maximum value of the k.

According to the present embodiment 2, the maximum value of the positive integers is made less than the least common multiples of any two positive integers other than the maximum value. As a result, the collision report cycle of the two mobile stations becomes greater than the maximum value of the k, which offers an advantage of being able to reduce the probability of the collision between the QI transmission.

Embodiment 3

In the present embodiment 3, the relations about the possible k values (other than 0 or 1) are specified that larger k values are obtained from smaller k values, and that the larger k values each have the relation of "the least common multiple of smaller two k values plus one". Considering such k values, the k takes the values 0, 1, 2, 3, 5, 7, 11, 15, 16, 22, 23, 31, 33, 34, 49, . . . , which are similar to the "values without having the relation of a multiple" as specified in the foregoing embodiment 1. Accordingly, the present embodiment 3 can reduce the probability of the collision between the QI transmission of the particular mobile stations.

In addition, setting a unique relation between the smaller k values and the larger k values makes it possible to obtain the larger k's from the smaller k's, and hence to obtain the larger values as needed. This offers an advantage of being able to eliminate the need for storing all the possible numbers of k in the base station when there are many k values.

Although the present embodiment 3 takes an example of "(the least common multiple of two smaller k's)+1", this is not essential. For example, it is obvious that other similar relationships between the k values are possible, such as the relation "(the least common multiple of two smaller k's)+3".

As described above, the communication system of the present embodiment 3 is configured such that the mobile-stations (2) transmit to the base station (1) the quality information (QI) about the downlink (3) from the base station (1) to the mobile stations (2) at alterable report cycles (k), and the communication system includes the channel (5) that varies the transmission rate by changing the transmission format of the data transmitted from the base station (1) through the downlink (3) according to the quality information (QI) transmitted, wherein the individual report cycles (k) of the mobile stations (2) are selected from 0, 1 and positive integers equal to or greater than two, and the positive integers are obtained in such a manner that the larger values are obtained from the smaller values.

As is clear from the description above, according to the present embodiment 3, the report cycles k of the mobile stations in the combination of particular mobile stations are selected from 0, 1 and positive integers equal to or greater than two, and the larger values are obtained from the smaller values. As a result, the present embodiment 3 offers an advantage of being able to reduce the probability of the collision between the QI transmission of particular mobile stations, and to eliminate the need for storing all the possible numbers of k in the base station when there are many k values.

Embodiment 4

Figure 9:
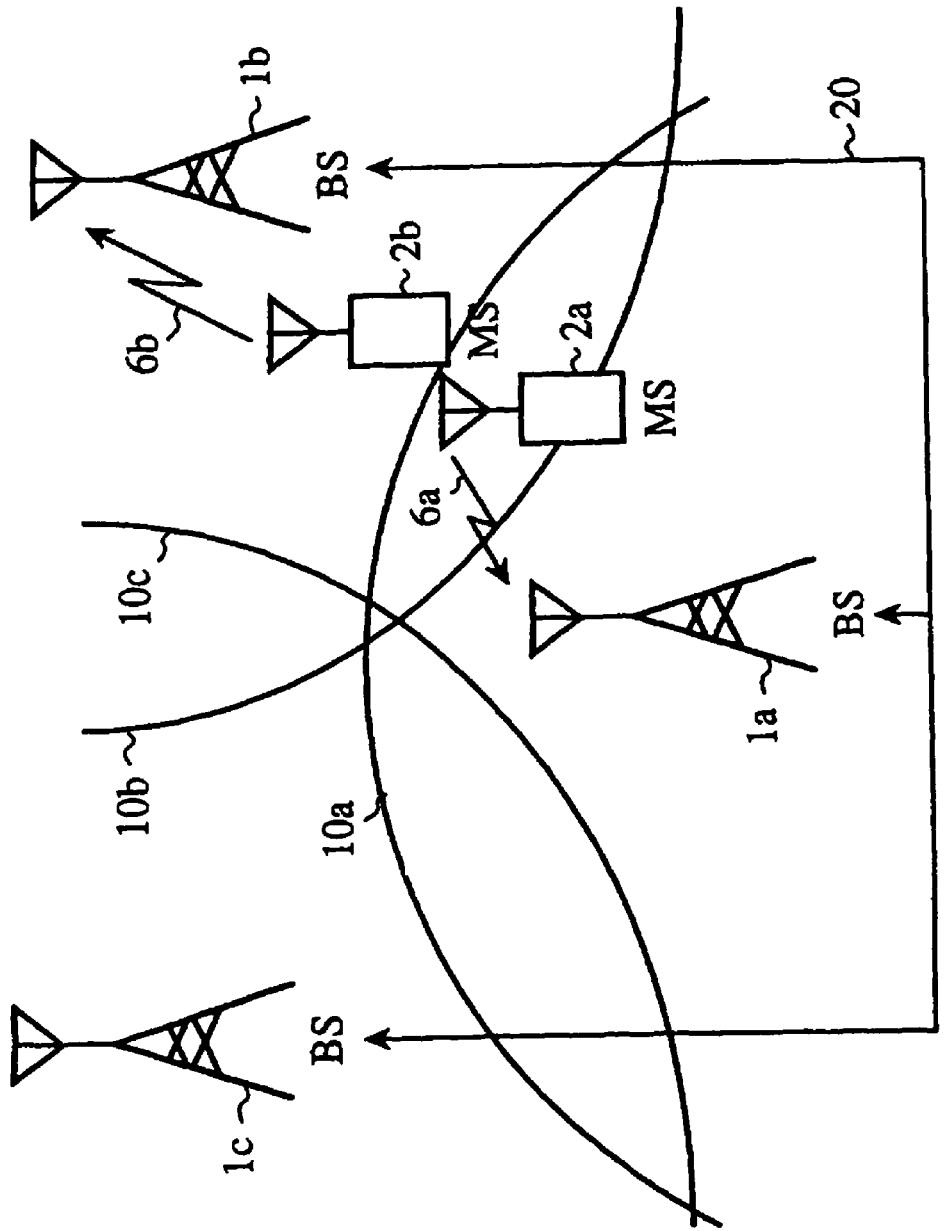
FIG. 9 is a diagram showing a communication system of an embodiment 4 in accordance with the present invention.

FIG. 9 is a diagram showing a communication system of an embodiment 4 in accordance with the present invention. In FIG. 9, reference numerals 1a, 1b and 1c each designate a base station, 10a, 10b and 10c each designate a communication area (cell) of each of the base stations 1a, 1b and 1c, and 2a and 2b each designate a mobile station. The reference numeral 20 designates an inter-base station communication line, and reference numerals 6a and 6b each designate a HS-DPCCH transmission from each of the mobile stations 2a and 2b.

In FIG. 9, only the uplinks 6 (6a and 6b: HS-DPCCH transmission) from the mobile stations 2 to the base stations 1 are shown among the links (channels) between the base stations 1 and mobile stations 2 to simplify the explanation.

Next, the operation will be described.

The foregoing embodiments 1-3 describe the method of selecting the k values associated with the QI transmission timing control for a single base station. In contrast, the present embodiment 4 considers a case where a plurality of base stations are present, and the cells overlap with each other.

Generally, the base stations are installed such that the cells overlap with each other to prevent interruption of communication. In this case, if a plurality of mobile stations 2a and 2b carry out the QI transmission to the different base stations 1a and 1b in the areas where the cells overlap as shown in FIG. 9, the probability of the transmission collision increases when the group of the possible k values is the same, and the interference between the mobile stations increases.

In this case, the base stations exchange information about the possible numbers of k with each other via the inter-base station communication line 20, and use different groups of k. This makes it possible to reduce the probability of the collision between the QI transmission, and to reduce the interference between the mobile stations at the same time.

In particular, as for the smaller k that can readily cause the collision, the base stations specify the different values.

As an extreme case, for example, consider the case where the base stations change the smallest k value other than 0 and 1, such as the base station 1a employs k={0, 1, 5, 11, 21, . . . }, the base station 1b uses k={0, 1, 6, 11, 21, . . . }, and the base station 1c employs k={0, 1, 7, 11, 21, . . . }. In this case, the base stations as a whole can reduce the probability of the collision between the QI transmission, and the interference between the mobile stations.

As a method of changing the possible numbers of k for the individual base stations, it is possible to use the values based on the relationships described in the foregoing embodiment 3. Specifically, the values can be set such as "(the least common multiple of two smaller k's)+1", "(the least common multiple of two smaller k's)+2", and "(the least common multiple of two smaller k's)+3".

In addition, although the present embodiment 4 notifies the base stations of the groups of the k values via the inter-base station communication line 20, other methods can also be used. For example, the individual base stations broadcast information about the k values, and other base stations receive the information, so that the individual base stations set the different groups of k values on an autonomous basis.

As described above, the communication system of the present embodiment 4 is configured such that the mobile stations (2) transmit to the base stations (1) the quality information (QI) about the downlinks (3) from the base stations (1) to the mobile stations (2) at alterable report cycles (k), and the communication system includes the channel (5) that varies the transmission rate by changing the transmission format of the data transmitted from the base stations (1) through the downlinks (3) according to the quality information (QI) transmitted, wherein the individual base stations (1) receive the quality information (QI) from the mobile stations (2) at the report cycles (k) whose possible values differ from each other.

In the communication system of the present embodiment 4, the base stations (1) each exchange the report cycles (k), at which the base stations receive the quality information (QI) from the mobile stations (2), via the inter-base station communication line (20) connecting the base stations (1) each.

As is clear from the description above, the present embodiment 4 is configured such that the base stations exchange the information about the possible numbers of k with each other, and use different groups of k from each other. As a result, the present embodiment 4 offers an advantage of being able to reduce the probability of the collision between the QI transmission, and to reduce the interference between the mobile stations at the same time.

The present embodiment 4 is configured such that the report cycle k is transmitted via the inter-base station communication line connecting the individual base stations. As a result, using the different groups of k offers an advantage of being able to reduce the probability of the collision between the QI transmission, and to reduce the interference between the mobile stations at the same time.

INDUSTRIAL APPLICABILITY

As described above, the communication system in accordance with the present invention is suitable for the communication system in which a plurality of mobile stations are present for a base station, and for the communication system and the like in which mobile stations are present at a distance of a base station.

What is claimed is:

1. A communications system, comprising:
a base station configured to transmit high-speed packet data through a high-speed packet data channel used for transmission of the high-speed packet data; and
a mobile station configured to transmit a quality information related to a downlink including the high-speed packet data channel, which includes a Dedicated Physical Data Channel (DPDCH) and a Dedicated Physical Control Channel (DPCCH), to the base station, the high-speed packet data of the DPDCH and DPCCH being spread by a channel separating spreading code and multiplied by an identification code, wherein
the base station transmits to the mobile station one of a defined set of a transmitting cycle period k for transmitting the quality information QI from the mobile station, the set comprising a plurality of integers as the transmitting cycle period, 0, 1, at least two even positive integers having no multiple relationship each other, and at least two even positive integers having the multiple relationship and being equal to or larger than the two even positive integers having no multiple relationship each other, and
the mobile station is configured to transmit the quality information to the base station by using a control channel for transmitting a response signal associated with the high-speed packet data based on the transmitting cycle transmitted from the base station.

2. A communications system, comprising:
a base station configured to receive high-speed packet data through a high-speed packet data channel used for transmission of the high-speed packet data; and
a mobile station configured to transmit a quality information related to a downlink including the high-speed packet data channel, which includes a Dedicated Physical Data Channel (DPDCH) and a Dedicated Physical Control Channel (DPCCH), to the base station, the high-speed packet data of the DPDCH and DPCCH being spread by a channel separating spreading code and multiplied by an identification code,
the base station transmits to the mobile station one of a defined set of a transmitting cycle period k for transmitting the quality information QI from the mobile station, the set comprising a plurality of integers as the transmitting cycle period, 0, 1, at least two even positive integers having no multiple relationship each other, and at least two even positive integers having the multiple relationship and being equal to or larger than the two even positive integers having no multiple relationship each other, and
the mobile station includes
a receiving unit configured to receive transmitting cycle transmitted from the base station; and
a transmitting unit configured to transmit the quality information to the base station based on the transmitting cycle received by the receiving unit, by means of a subframe where a domain for a response signal associated with the high-speed packet data, and a domain for the quality information are separately prepared.

3. A communications method, comprising:

transmitting cycle transmitting step of transmitting a transmitting cycle to a mobile station;

quality information transmitting step of transmitting a quality information related to a downlink to a base station; and transmitting to the base station, via a control channel, a response signal associated with high-speed packet data transmitted, via a high-speed packet data channel, which includes a Dedicated Physical Data Channel (DPDCH) and a Dedicated Physical Control Channel (DPCCH), from the mobile station, the high-speed packet data of the DPDCH and DPCCH being spread by a channel separating spreading code and multiplied by an identification code, wherein the transmitting cycle transmitting step includes transmitting one of a defined set of a transmitting cycle period k for transmitting the quality information QI from the mobile station, the set comprising a plurality of integers as the transmitting cycle period, 0, 1, at least two even positive integers having no multiple relationship each other, and at least two even positive integers having the multiple relationship and being equal to or larger than the two even positive integers having no multiple relationship each other, and the quality information transmitting step includes transmitting the quality information by using a control channel based on the transmitting cycle.

4. A communications method, comprising:

transmitting cycle transmitting step of transmitting a transmitting cycle to a mobile station, quality information transmitting step of transmitting quality information related to a downlink to a base station; and transmitting, via a control channel, a response signal associated with high-speed packet data transmitted, via a high-speed packet data channel, which includes a Dedicated Physical Data Channel (DPDCH) and a Dedicated Physical Control Channel (DPCCH), from the base station, the high-speed packet data of the DPDCH and DPCCH being spread by a channel separating spreading code and multiplied by an identification code, wherein the transmitting cycle transmitting step includes transmitting one of a defined set of a transmitting cycle period k for transmitting the quality information QI from the mobile station, the set comprising a plurality of integers as the transmitting cycle period, 0, 1, at least two even positive integers having no multiple relationship each other, and at least two even positive integers having the multiple relationship and being equal to or larger than the two even positive integers having no multiple relationship each other, the quality information transmitting step includes transmitting the quality information based on the transmission cycle, and the quality information transmitting step is the step of transmitting the quality information by means of a subframe where a domain for the response signal associated with the high-speed packet data, and a domain for the quality information are separately prepared.

5. A communications system, comprising:

a base station configured to transmit high-speed packet data using a high-speed packet data channel used for transmission of high-speed packet data; and a mobile station configured to transmit a quality information related to a downlink including the high-speed packet data channel, which includes a Dedicated Physical Data Channel (DPDCH) and a Dedicated Physical Control Channel (DPCCH), to the base station based on a transmitting cycle, the high-speed packet data of the DPDCH and DPCCH being spread by a channel separating spreading code and multiplied by an identification code, wherein the base station transmits to the mobile station one of a defined set of a transmitting cycle period k for transmitting the quality information QI from the mobile station, the set comprising a plurality of integers as the transmitting cycle period, 0, 1, at least two even positive integers having no multiple relationship each other, and at least two even positive integers having the multiple relationship and being equal to or larger than the two even positive integers having no multiple relationship each other, and the mobile station is configured to transmit the quality information to the base station through a control channel used for transmitting a response signal associated with high-speed packet data transmitted from the base station via the high-speed packet data channel, and the quality information is transmitted under the timing control based on the transmitting cycle.

6. A communications system, comprising:

a base station configured to transmit high-speed packet data using a high-speed packet data channel used for transmission of high-speed packet data; and a mobile station configured to transmit a quality information related to a downlink including the high-speed packet data channel, which includes a Dedicated Physical Data Channel (DPDCH) and a Dedicated Physical Control Channel (DPCCH), to the base station based on a transmitting cycle, the high-speed packet data of the DPDCH and DPCCH being spread by a channel separating spreading code and multiplied by an identification code, wherein the base station transmits to the mobile station one of a defined set of a transmitting cycle period k for transmitting the quality information QI from the mobile station, the set comprising a plurality of integers as the transmitting cycle period, 0, 1, at least two even positive integers having no multiple relationship each other, and at least two even positive integers having the multiple relationship and being equal to or larger than the two even positive integers having no multiple relationship each other, and the mobile station includes a transmitting unit configured to transmit the quality information to the base station by means of a subframe where a domain for a response signal associated with the high-speed packet data and a domain for the quality information are separately prepared, and the quality information is transmitted under the timing control based on the transmitting cycle.

7. A communications method, comprising:

transmitting high speed packet data to a mobile station using a high-speed packet data channel used for transmission of the high speed packet data; and transmitting a transmitting cycle to the mobile station;

transmitting quality information related to a downlink to a base station based on a transmitting cycle by using a control channel; and transmitting to the base station via the control channel a response signal associated with the high-speed packet data transmitted via a high-speed packet data channel, which includes a Dedicated Physical Data Channel (DPDCH) and a Dedicated Physical Control Channel (DPCCH), from the mobile station, the high-speed packet data of the DPDCH and DPCCH being spread by a channel separating spreading code and multiplied by an identification code, wherein the transmitting cycle transmitting step includes transmitting one of a defined set of a transmitting cycle period k for transmitting the quality information QI from the mobile station, the set comprising a plurality of integers as the transmitting cycle period, 0, 1, at least two even positive integers having no multiple relationship each other, and at least two even positive integers having the multiple relationship and being equal to or larger than the two even positive integers having no multiple relationship each other, and a transmission of the quality information performed in the quality information transmitting step is controlled based on the transmitting cycle.

8. A communications method, comprising;

transmitting high speed packet data to a mobile station using a high-speed packet data channel used for transmission of the high speed packet data;

transmitting a transmitting cycle to the mobile station;

transmitting step of transmitting quality information related to a downlink to a base station based on a transmitting cycle by using a control channel; and transmitting via a control channel a response signal associated with the high-speed packet data transmitted, via a high-speed packet data channel, which includes a Dedicated Physical Data Channel (DPDCH) and a Dedicated Physical Control Channel (DPCCH), from the base station, the high-speed packet data of the DPDCH and DPCCH being spread by a channel separating spreading code and multiplied by an identification code, wherein the transmitting cycle transmitting step includes transmitting one of a defined set of a transmitting cycle period k for transmitting the quality information QI from the mobile station, the set comprising a plurality of integers as the transmitting cycle period, 0, 1, at least two even positive integers having no multiple relationship each other, and at least two even positive integers having the multiple relationship and being equal to or larger than the two even positive integers having no multiple relationship each other, and the quality information transmitting step includes transmitting the quality information to the base station by means of a subframe where a domain for the response signal associated with the high-speed packet data and a domain for the quality information are separately prepared, and a transmission of the quality information is controlled based on the transmitting cycle.

\* \* \* \* \*